Patented Oct. 18, 1932

1,882,778

UNITED STATES PATENT OFFICE

MOSES L. CROSSLEY AND MAURICE L. DOLT, OF PLAINFIELD, NEW JERSEY, ASSIGNORS TO THE CALCO CHEMICAL COMPANY, INC., OF BOUND BROOK, NEW JERSEY, A CORPORATION OF DELAWARE

NEW MORDANT

No Drawing. Application filed December 19, 1929. Serial No. 415,355.

This invention relates to new mordants for use in fixing dyes in paper.

Mordants heretofore produced for use in dyeing cotton, including that described in our co-pending application, Serial No. 415,354, filed December 19, 1929, which has a remarkably high mordanting power on cotton, have proved to be unable, even when used in high concentrations, to fix basic dyes in the fibres of paper satisfactorily.

The new mordants of our present invention, even when used in low concentrations, render basic dyes on paper non-bleeding, a result which, so far as we are aware, has not heretofore been attained satisfactorily.

Although a standard of mordanting power known as "type" and based on a comparison with tannic acid has obtained commercial recognition, it has not yet, so far as we known, been included in scientific textbooks. Therefore, in order to define our new mordants with precision, we describe the test used to measure mordanting power on this basis:

Cotton is dyed with a basic dye solution using as a mordant a solution of tannic acid of the strength customarily used with that dye solution. Cotton is then dyed with the same dye solution with a solution of the mordant to be tested, and the strength of the mordanting solution is varied until the intensity of color obtained on the cotton is the same as that obtained with the use of the tannic acid mordanting solution. The strength of the solution of the mordant under test is then compared with the strength of the tannic acid mordanting solution. If these are the same, the mordanting power of the mordant tested is said to be equal to "type". But, if, for example, in such a test a two per cent. solution of the mordant tested is found to produce the same effect as a four per cent. solution of tannic acid, the mordanting power of the mordant tested is said to be two times "type".

The new mordants are alkali-metal salts of phenol-sulphur condensation products, and have the following properties:

Appearance: light-tan-colored powders.

Solubility: completely soluble in water at room temperature.

Mordanting power on cotton: about one and one-half times "type".

Mordanting effect on paper: one to two per cent. solutions render basic dyes, such as rhodamines and auramines, non-bleeding.

The process by which the new mordants are produced consists of two parts. The first part is the forming of a particular phenol-sulphur condensation product by fusing and heating solid phenol and sulphur with a caustic catalyst for a limited period at a limited temperature, and separating the excess phenol from the condensation product by distillation under vacuum without increase in temperature. The second part consists in making an alkali-metal salt of a condensation product by mixing it with a substantial proportion of alkali-metal caustic and fusing the condensation product and the caustic together, which causes a reaction to take place between them. It will be understood that the condensation product is essentially acid in reaction and that, since under the conditions described it reacts with the alkali caustic, the reaction product is herein termed a "salt" in the broad sense of that term, although its chemical composition is complex and cannot be exactly stated.

In the first part of the process, solid phenol and sulphur are most desirably used in the proportion of two molecules of phenol to 3½ atoms of sulphur. The catalyst may be any alkali-metal caustic. A very small amount, less than one per cent, of the caustic is sufficient to have the necessary catalytic action. The use of more than this amount is objectionable, since it is not desired that the caustic enter into the condensation product formed. The heating is limited to 180° C. About two and one-half to three hours are required to raise the mixture from its fusing temperature to 180° C. The latter temperature is maintained for only about six hours. At the end of this period, the excess phenol is removed by vacuum distillation without increasing the temperature above 180° C.

In the second part of the process, sufficient caustic should be used to neutralize the acidity of the condensation product and render it soluble. It is undesirable to use more caustic than is necessary to effect this purpose, as this results in the presence of free caustic in the final product. As a practical matter, the caustic should be equal to from twenty to thirty per cent by weight of the condensation product with which it is fused.

A specific example of the method is described in detail, for the sake of illustration:

Seventy-two parts of solid phenol are mixed with forty-two parts of sulphur and a small quantity of flaked caustic (NaOH) to serve as a catalyst. The amount of caustic used should be less than one per cent, and is most desirable about 0.6%. The mixture is placed in a vessel provided with a reflux condenser and heated until all of its ingredients are fused. This occurs at about 120° C. The mixture is then thoroughly stirred and its temperature raised gradually to 180° C., maintaining a uniform rate of reflux. It requires about 2.5 to 3 hours to reach this point. The temperature is then maintained at 180° C. for six hours. The excess phenol is distilled off at 180° C. under vacuum and the condensation product which has been formed allowed to cool and harden. The condensation product is broken into small lumps and mixed with flaked caustic (NaOH) in an amount equal to about twenty-five per cent of the condensation product by weight. The condensation product and the caustic are mixed by grinding them together and the mixed mass is then heated gradually until it fuses. This occurs at about 100° to 110° C. When the mixture is fused, a reaction takes place between the condensation product and the caustic. The fused product is allowed to cool until it becomes a hard brittle mass. This mass is then broken up, ground to powder, producing the mordant for rendering basic dyes non-bleeding on paper and having other properties heretofore described.

The expression "alkali metal" as used in this specification and the claims which follow is to be understood to include the putative metal $NH_4$.

What is claimed is:

1. The hereindescribed alkali-metal salts of phenol-sulphur condensation products, which are light-tan-colored powders, soluble in water at room temperature, have a mordanting power on cotton about one and one-half times "type", and which are capable when used in weak solutions of rendering basic dyes on paper non-bleeding.

2. A process for making a mordant for fixing dyes on paper, comprising mixing solid phenol and sulphur substantially in the proportion of two molecules of phenol to 3½ atoms of sulphur with less than one per cent of caustic, fusing the mixture and heating it to 180° C., maintaining it at 180° C. to form a sulphur-phenol condensation product, separating the excess phenol from the condensation product by vacuum distillation at 180° C., and fusing together the condensation product and a substantial proportion of caustic.

3. In a process for making a mordant for use on paper, the steps of mixing solid phenol and sulphur in the proportion of two molecules of phenol to 3½ atoms of sulphur with a quantity not exceeding one per cent of caustic, fusing the mixture and heating it to 180° C., maintaining it at 180° C. for a period of about six hours, and distilling off the excess phenol without an increase in temperature.

In testimony whereof we have hereunto set our hands.

MOSES L. CROSSLEY.
MAURICE L. DOLT.